United States Patent
Worth, II

(10) Patent No.: US 9,361,513 B2
(45) Date of Patent: Jun. 7, 2016

(54) SORTING SYSTEM USING WEARABLE INPUT DEVICE

(71) Applicant: Floyd W. Worth, II, Richardson, TX (US)

(72) Inventor: Floyd W. Worth, II, Richardson, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 16 days.

(21) Appl. No.: 14/058,817

(22) Filed: Oct. 21, 2013

(65) Prior Publication Data

US 2015/0110343 A1   Apr. 23, 2015

(51) Int. Cl.
*G06K 9/03* (2006.01)
*G06K 9/00* (2006.01)
*B07C 3/14* (2006.01)
*B07C 7/00* (2006.01)
*G06K 9/22* (2006.01)

(52) U.S. Cl.
CPC .............. *G06K 9/00442* (2013.01); *B07C 3/14* (2013.01); *B07C 7/005* (2013.01); *G06K 9/22* (2013.01)

(58) Field of Classification Search
None
See application file for complete search history.

(56) References Cited

U.S. PATENT DOCUMENTS

| | | | | |
|---|---|---|---|---|
| 6,484,066 | B1 * | 11/2002 | Riess | G01B 11/00 198/502.2 |
| 7,377,429 | B2 * | 5/2008 | Anderson | B07C 7/005 235/375 |
| 2002/0036160 | A1 * | 3/2002 | Reed | B07C 3/00 209/546 |
| 2004/0064326 | A1 * | 4/2004 | Vaghi | 705/1 |
| 2004/0230542 | A1 * | 11/2004 | Obrea | 705/401 |
| 2007/0215529 | A1 * | 9/2007 | Desprez | B07C 3/14 209/584 |
| 2008/0143954 | A1 * | 6/2008 | Abreu | 351/158 |
| 2011/0102458 | A1 * | 5/2011 | Takiguchi et al. | 345/629 |

* cited by examiner

*Primary Examiner* — Utpal Shah
*Assistant Examiner* — Mai Tran

(57) ABSTRACT

Methods for sorting mail pieces and corresponding systems and computer-readable mediums. A method includes determining that a camera of a wearable device is directed at a mail piece and capturing an image of the mail piece by the camera of the wearable device. The method includes transmitting the image from the wearable device to a mail processing system and notifying a user wearing the wearable device of a sort location of the mail processing system that corresponds to the mail piece.

20 Claims, 3 Drawing Sheets

SORTING SYSTEM USING WEARABLE INPUT DEVICE

TECHNICAL FIELD

The present disclosure is directed, in general, to sorting systems and methods, and in particular to systems that enhance manual sorting processes.

BACKGROUND OF THE DISCLOSURE

Mail, parcels, and other items are often sorted. Improved systems are desirable.

SUMMARY OF THE DISCLOSURE

Various disclosed embodiments include methods for sorting mail pieces and corresponding systems and computer-readable mediums. A method includes determining that a camera of a wearable device is directed at a mail piece and capturing an image of the mail piece by the camera of the wearable device. The method includes transmitting the image from the wearable device to a mail processing system and notifying a user wearing the wearable device of a sort location of the mail processing system that corresponds to the mail piece.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software, or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
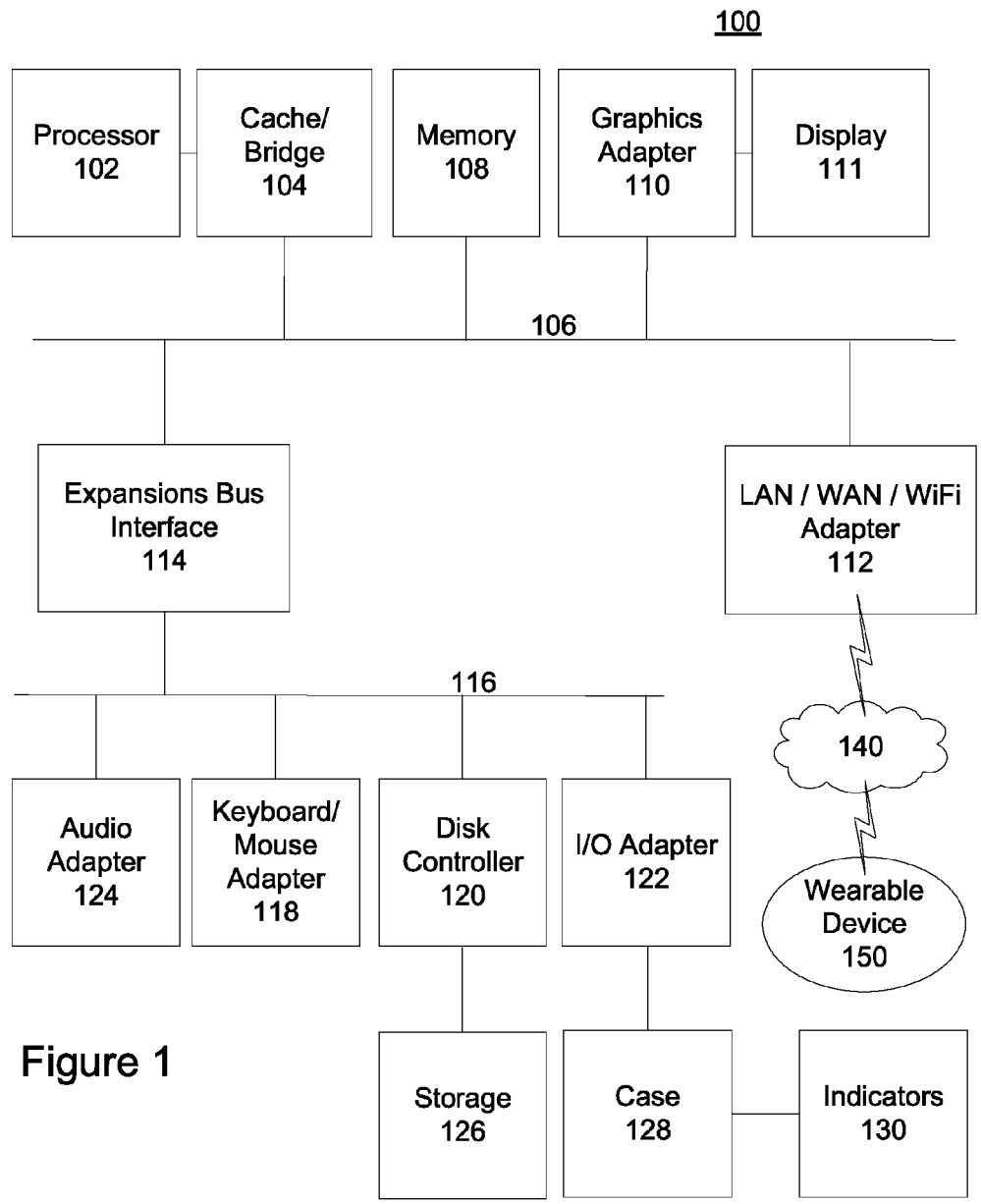
FIG. 1 depicts a block diagram of a mail processing system in which an embodiment can be implemented.
Figure 2:
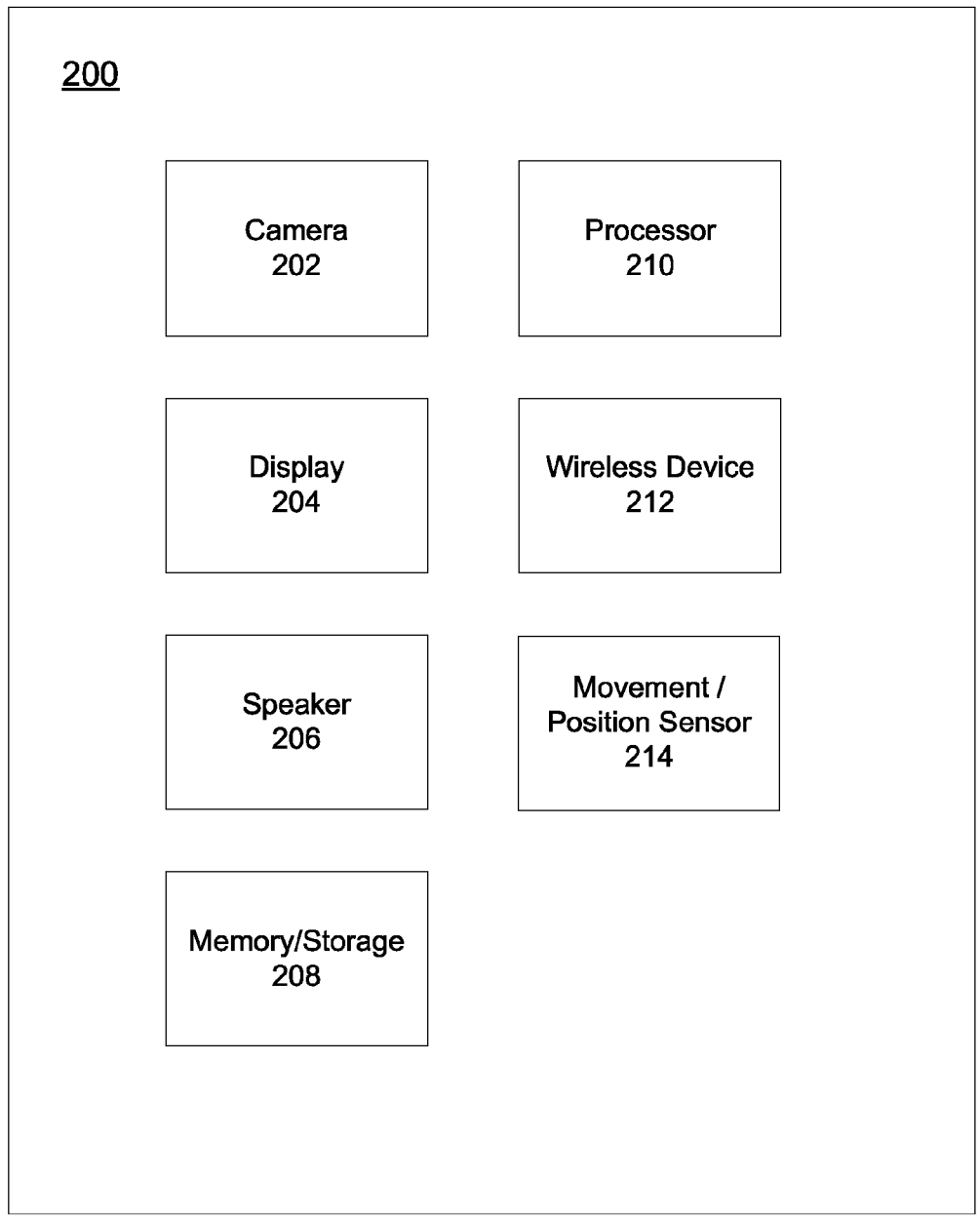
FIG. 2 illustrates a block diagram of functional elements of a wearable device 200 in accordance with disclosed embodiments.
Figure 3:
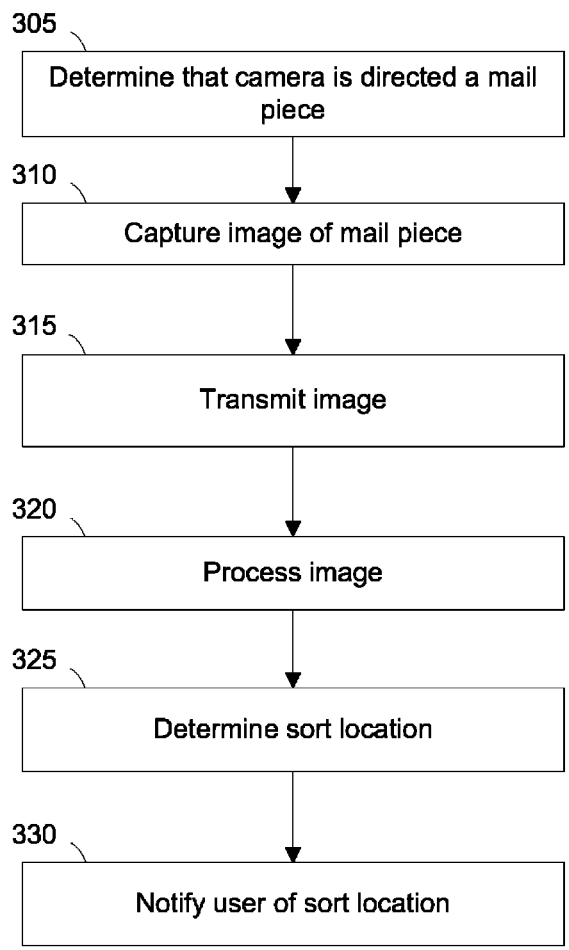
FIG. 3 depicts a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Currently, public and private couriers (such as governmental postal services, private letter and parcel delivery services, and others) perform a significant amount of manual sorting of mail pieces. For example, a United States Postal Service (USPS) letter carrier must often "case" mail by sorting it into a pigeon-hole type structure called a "Franklin Case." This sorting is generally to sequence mail for delivery when the mail has not been processed on automation equipment or at least has not been fully sorted by the automation equipment. In order for the letter carrier to perform this task, the carrier must read the address on each mail pieces and correlate that information to the proper pigeon-hold position in the Franklin Case.

To do so efficiently, the letter carrier must have specialized knowledge, training, and practice, referred to as "scheme knowledge." Furthermore, since this is a manual operation, it is difficult to capture and measure information about the sorting process, such as the quantity and productivity of the letter carrier, or about the mail pieces being sorted.

As used herein, "mail piece" refers to any letter, parcel, package, or other item being sorted or processed as described herein, whether being handled by the USPS, another governmental postal service, a private courier service, or other entity or organization.

Disclosed embodiments include systems and methods for improving the speed and accuracy of manual sorting and for capturing information regarding the mail pieces being processed.

FIG. 1 depicts a block diagram of a mail processing system in which an embodiment can be implemented, for example as a mail processing system particularly configured by software or otherwise to perform the processes as described herein, and in particular as each one of a plurality of interconnected and communicating systems as described herein. The mail processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

I/O adapter 122 can be connected, in various embodiments, to a case 128 into which the mail pieces are sorted. The case 128 can include indicators 130 described in more detail below.

Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. Storage 126 can store executable instructions for performing processes as described herein and can store a database that relates address information or other mail piece information to corresponding sort locations in case 128.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A mail processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of mail processing system 100), which can be any public or private data processing system network or combination of networks, as known to those of skill in the art, including the Internet. Mail processing system 100 can communicate over network 140 with a wearable device 150, described in more detail below.

Disclosed embodiments can use a wearable device, such as could be implemented using the Google Glass® wearable computer peripheral, to aid in proper sorting of mail pieces into a case such as a Franklin Case or other case with a plurality of receptacles for receiving the mail pieces. The wearable device allows the user—the person performing a manual sort of the mail pieces—to naturally obtain input regarding the mail pieces when performing the sort, eliminating extraneous movement or delay. In addition to eyeglass-type wearable devices, a device integrated with or mounted on a headpiece, visor, or other wearable apparatus can function as the wearable device.

While performing a manual sort, the user naturally directs his head and gaze toward the mail piece to read information indicated on the mail piece, such as destination name, destination address, postage indicia, barcodes, and other information, generally referred to herein as mail piece information. According to disclosed embodiments, when the user directs his gaze toward the mail piece, an input camera of the wearable device is also naturally directed toward the mail piece and automatically takes an image of the mail piece information.

The wearable device can then wirelessly transmit the image to a mail processing system (such as mail processing system 100) configured to perform processes as described herein, including image processing. The mail processing system processes the image to extract and store the mail piece information, which can include performing an OCR process on any text, reading and interpreting any barcodes, verifying postage paid, and otherwise. As part of processing the image, the mail processing system can also determine other information, such as determining the dimensions of the mail piece. The mail piece information can include any number of physical characteristics of the mail piece or other object being imaged, including dimensions, colors, shapes, materials, and others, and can use these characteristics to determine still other information, such as deriving an estimated weight based on the dimensions, materials, or other physical characteristics. The mail processing system can also aggregate data, such as keeping track of the volume and type of mail pieces being processed manually in accordance with disclosed embodiments.

From the mail piece information, the mail processing system can determine the proper sort location in the case for the mail piece, in addition to performing other actions. For example, the mail processing system may extract the mail piece information, identify the destination address in the mail piece information, and determine the sort location in the case that corresponds to the destination address.

The mail processing system can then indicate, to the user, the sort location into which the mail piece should be placed. This can be performed, for example, using indicators 130 on the case, such as a lamp or LED proximate to each of the possible sort locations, where a respective one of the indicators is lit to indicate the proper sort location for each mail piece.

In other cases, the sort location information can be transmitted back to the wearable device to be presented to the user. For example, an audio feedback can be used in which the wearable device audibly says "Slot C2" to the user, indicating that the user should place the mail piece in sort location C2. Similarly, a visual feedback can be used where the wearable device displays the sort location, such as "C2" to the user. In either case, the feedback can be presented quickly enough after the image is acquired that the user is able to continue a natural sorting motion. Of course, other sort location identifiers other than letter-number coordinate information can be used to identify the proper sort location.

For example, the user naturally looks at the mail piece then turns or reaches to the case to place the mail piece in the proper sort location, and the processing described above can occur simultaneously, in real time, so that the image is acquired when the user looks at the mail piece, then as the user moves to place the mail piece in the case, the mail processing system gives him immediate audio or visual feedback as to which sort location the mail piece should be placed in. This eliminates any extra steps or time required, for example, to separately place the mail piece in a scanning device for imaging and processing.

FIG. 2 illustrates a block diagram of functional elements of a wearable device 200 in accordance with disclosed embodiments. Wearable device can be implemented in an eyeglass-type apparatus supported by the user's ears and nose, a visor-type apparatus supported by a band or brim around the head, or otherwise.

Wearable device 200 can include a camera 202 that is positioned and configured to obtain an image of a mail piece, preferably when the user looks at each mail piece. Wearable device 200 can include a display 204, for example, for providing the visual feedback described above. Display 204 can be, for example, a lens positioned in front of one or both of the user's eyes to provide the visual feedback without interfering with the user's vision.

Wearable device 200 can include a speaker 206 for providing the audio feedback described above. Speaker 206 can be implemented as any speaker, and can preferably be implemented as an earpiece so that the audio feedback is heard only by the user.

Wearable device 200 can include a memory/storage 208 (referred to generically as memory 208) that can include any known volatile or non-volatile storage. Memory 208 can store executable instructions, pre-recorded audio feedback, images for visual feedback, the images captured by camera 202, and other data.

Wearable device 200 can include one or more processors 210. Processor 210 can communicate with and control each of the other elements of wearable device 200 to perform the processes described herein.

Wearable device 200 can include a wireless device 212 that is configured to communicate with the mail processing system. Wireless device 212 can use any wireless protocol known to those of skill in the art, including but not limited to Bluetooth® or WiFi® communications.

Wearable device 200 can include a movement/position sensor 214 (referred to generically as position sensor 214), such as a multi-axis accelerometer or otherwise, that can determine the current position, orientation, and movement of wearable device 200. Position sensor 214 can be used in specific embodiments to determine when the user has looked at a mail piece, such as by detecting the movement or orientation of the user's head, and the wearable device 200 can respond by automatically acquiring an image of the mail piece. Position sensor 214 can be calibrated by or to a user so that it detects the movement or orientation of the user's head that corresponds to looking at the mail piece, which aids in performing the image capture as the user is naturally looking at the mail piece.

In other embodiments, the camera 202 can be constantly searching for appropriate images, and wearable device 200 can detect when the image includes a mail piece with mail piece information. In response to such a determination, the wearable device 200 can respond by automatically acquiring storing and transmitting the image of the mail piece as described herein.

FIG. 3 depicts a flowchart of a process in accordance with disclosed embodiments that may be performed, for example, by a mail processing system and wearable device as described herein.

The wearable device is worn by a user performing a sorting operation.

The wearable device determines that its camera is directed at a mail piece (305). This can be performed by detecting the mail piece in a real-time image stream being captured by the camera, by determining from the movement or position of the wearable device that its camera is directed at the mail piece, or otherwise.

The wearable device captures an image of the mail piece (310).

The wearable device transmits the image to the mail processing system (315).

The mail processing system processes the image (320). This can include extracting and storing mail piece information, which can include performing an OCR process on any text, reading and interpreting any barcodes, verifying postage paid, and otherwise. As part of processing the image, the mail processing system can also determine other information, such as determining the dimensions of the mail piece.

The mail processing system can determine the proper sort location in a case for the mail piece (325). This can include identifying a destination address in the mail piece information and determine the sort location in the case that corresponds to the mail piece or its destination address.

The user is notified of the sort location in the case for the mail piece (330). In some cases, this is performed by the mail processing system activating a lamp or other indicator proximate to the sort location or by audibly indicating the sort location using coordinates or otherwise. In other cases, information indicating the sort location is transmitted to the wearable device, and the wearable device indicates to the user the sort location, such as by audibly indicating the sort location using coordinates or by displaying the coordinates or other indicator to the user.

The user can then place the mail piece in the sort location. Preferably, the process described above is performed quickly enough the user is notified of the sort location by the time he moves from looking at the mail piece into position to place the mail piece in the sort location.

The principles and processes described herein can be applied to other processes, particularly where automatic image acquisition and processing can be used to provide real-time feedback to a user performing a manual process, including cases where a wired or wirelessly-connected computer can provide feedback to the user as to a specific action to be performed based on the image.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all mail processing systems suitable for use with the present disclosure is not being depicted or described herein. Instead, only so much of a mail processing system as is unique to the present disclosure or necessary for an understanding of the present disclosure is depicted and described. The remainder of the construction and operation of mail processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for sorting mail pieces, comprising:
   determining that a camera of a wearable device is directed at a mail piece, wherein the wearable device is carried by a user's head, and wherein the wearable device determines that the camera is directed at the mail piece when the user's head is directed toward the mail piece;
   automatically capturing an image of the mail piece by the camera of the wearable device when a user looks at the mail piece;
   transmitting the image from the wearable device to a mail processing system;
   notifying a user wearing the wearable device of a sort location at the mail processing system that corresponds to the mail piece when the user moves to place the mail piece in a case having a plurality of receptacles for receiving mail pieces;
   receiving the sort location transmitted to the wearable device by the mail processing system; and
   presenting to the user wearing the wearable device the sort location by displaying a feedback indicator of the sort location using a display of the wearable device or by activating an indicator proximate to the sort location, and
   wherein the wearable device comprises a memory storing pre-recorded audio feedback.

2. The method of claim 1, wherein the mail processing system processes the image to extract mail piece information and determines the sort location from the mail piece information.

3. The method of claim 1, wherein the mail processing system processes the image to extract mail piece information, determines the sort location from the mail piece information, and transmits information indicating the sort location to the wearable device.

4. The method of claim 1, wherein the wearable device is implemented in an eyeglass-type apparatus.

5. The method of claim 1, wherein the mail processing system processes the image to extract mail piece information, the mail piece information including physical characteristics of the mail piece.

6. A wearable device configured to wirelessly communicate with a mail processing system, the wearable device comprising:
   a processor;
   an accessible memory;
   a speaker;
   a display; and
   a camera,
   the wearable device configured to
      determine that the camera is directed at a mail piece, wherein the wearable device is carried by a user's head and the wearable device determines that the camera is directed at the mail piece when the user's head is directed toward the mail piece;
      automatically capture an image of the mail piece by the camera when the user looks at the mail piece; and
      transmit the image to the mail processing system,
   wherein a user wearing the wearable device is notified of a sort location at the mail processing system that corresponds to the mail piece when the user moves to place the mail piece in a case having a plurality of receptacles for receiving mail pieces, the sort location being transmitted by the mail processing system to the wearable device to be presented to the user wearing the wearable device by displaying a feedback indicator of the sort location using the display or by activating an indicator proximate to the sort location, and
   wherein the accessible memory stores pre-recorded audio feedback.

7. The wearable device of claim 6, wherein the mail processing system processes the image to extract mail piece information and determines the sort location from the mail piece information.

8. The wearable device of claim 6, wherein the mail processing system processes the image to extract mail piece information, determines the sort location from the mail piece information, and transmits information indicating the sort location to the wearable device.

9. The wearable device of claim 6, wherein the wearable device is implemented in an eyeglass-type apparatus.

10. The wearable device of claim 6, wherein the mail processing system processes the image to extract mail piece information, the mail piece information including physical characteristics of the mail piece.

11. The method of claim 1, wherein the wearable device comprises a speaker for providing the audio feedback.

12. The method of claim 11, wherein the speaker is implemented as an earpiece so that the audio feedback is heard only by the user.

13. The wearable device of claim 6, wherein the speaker is implemented as an earpiece so that the audio feedback is heard only by the user.

14. The method of claim 1, wherein the wearable device comprises a speaker for providing an audio feedback to present the sort location to the user.

15. The wearable device of claim 6, wherein the wearable device comprises the speaker for providing an audio feedback to present the sort location to the user.

16. The method of claim 1, further comprising:
   extracting mail piece information from the image; and
   identifying a destination address from the mail piece information to determine the sort location that corresponds to the destination address.

17. The method of claim 16, wherein the feedback indicator of the sort location is coordinates of the sort location.

18. The method of claim 16, wherein the indicator of the sort location is a lamp.

19. The wearable device of claim 6, wherein the mail processing system to extract mail piece information from the image and identify a destination address from the mail piece information to determine the sort location that corresponds to the destination address.

20. The wearable device of claim 19, wherein the feedback indicator of the sort location is coordinates of the sort location or the indicator of the sort location is a lamp.

\* \* \* \* \*